United States Patent [19]

Lewis et al.

[11] 4,107,645

[45] Aug. 15, 1978

[54] SEAT BELT SYSTEM WITH STARTER ENGINE LOCK AND ALARM

[75] Inventors: Donald J. Lewis, Troy; Albert J. Jankowski, Royal Oak, both of Mich.

[73] Assignee: Allied Chemical Corporation, Morris Township, Morris County, N.J.

[21] Appl. No.: 255,740

[22] Filed: May 22, 1972

Related U.S. Application Data

[63] Continuation-in-part of Ser. No. 208,173, Dec. 15, 1971, abandoned.

[51] Int. Cl.² .............................................. B60R 21/10
[52] U.S. Cl. ................................. 340/52 E; 340/667; 307/10 SB; 180/82 C; 200/61.58 B
[58] Field of Search ............................ 340/52 E, 278; 307/10 SB; 180/101, 102, 82 C; 280/150 SB; 200/61.58 B

[56] References Cited

U.S. PATENT DOCUMENTS

| | | | |
|---|---|---|---|
| 3,359,539 | 12/1967 | Fink | 340/52 E |
| 3,449,714 | 6/1960 | Farley, Jr. | 307/10 SB |
| 3,500,946 | 3/1970 | Boyajian | 307/10 SB |
| 3,521,723 | 7/1970 | Snodgrass | 280/150 SB |
| 3,693,147 | 9/1972 | Seo et al. | 340/52 E |
| 3,729,059 | 4/1973 | Redmond | 340/52 E |

*Primary Examiner*—Alvin H. Waring
*Attorney, Agent, or Firm*—Roger H. Criss; Ernest D. Buff

[57] ABSTRACT

An automobile equipped with seat belts for the front passengers includes retractors for withdrawing the belts when not in use. Each seat equipped with a belt includes a pressure sensor to provide a signal when the seat is occupied. The retractors include switches indicating whether the belts are extended or retracted. A logic circuit receives the outputs of the sensor and the switches and inhibits the output of power to the starter until the pressure sensors first provide signals indicating the seats are occupied and then the switches associated with each such retractor provide signals indicating the belts have been extended. When an attempt is made to start the car in a normal manner and this sequence of conditions has not occurred, an alarm is sounded as well as the starter being inhibited. Means are provided for allowing the application of power to the starter motor and extinguishing the alarm in the absence of the proper sequence of signals under the control of the driver, in an emergency or when the car stalls.

12 Claims, 4 Drawing Figures

SEAT BELT SYSTEM WITH STARTER ENGINE LOCK AND ALARM

This application is a continuation-in-part of application Ser. No. 208,173, filed Dec. 15, 1971 and now abandoned.

BACKGROUND OF THE INVENTION

1. Field of the Invention

This invention relates to a system for sounding an alarm and inhibiting the application of power to an automobile starter motor until the occurrence of a sequence of signals from sensors associated with the vehicle seat and the seat belt indicating that the seat belts are in proper condition for operation of the vehicle and to means for disabling the operation of this alarm and inhibiting system under certain special conditions.

2. Description of the Prior Art

The need for a system for preventing the operation of an automobile unless the occupants have fastened their seat belts is well recognized and present government regulations require that new cars sold in the future be equipped with such systems. Previous systems for this purpose have generally involved variations of one of several concepts. One class of such systems has utilized switches built into the buckles of seat belts and interconnected with the starter motor circuitry so as to inhibit starting of the vehicle if the buckle is not fastened. Another class of systems employs switches associated with retractors for the seat belts to assure that the seat belts are extended before the vehicle can be started. A variation on this concept utilizes pressure sensitive switches built into the seats of the vehicle so as to condition starting of the vehicle on the closure of only the seat belts associated with occupied seats.

These previously proposed systems have generally met with two problems in actual use. First, most of the systems heretofore disclosed have been relatively simple to disable if the driver did not want to fasten his seat belt each time he occupied the car. This might be done by permanently fastening the tongue of one section of the belt buckle to the other section of the belt and pushing them into a seat crevice or by forming a knot or other protuberance on a belt section so that it is permanently disposed in an extended condition from its retractor.

Another class of problems encountered by prior art systems is related to their creation of complications during unusual situations which occur in the operation of the vehicle. For example, a system which requires that the seat belt buckle be latched within a predetermined time period before the engine is started may constitute a nuisance or create a danger in situations where the engine stalls. Rather than just restarting of the vehicle, the driver may be required to unfasten his seat belt and then refasten it before he can start the car. On a busy road this delay may be hazardous.

SUMMARY OF THE INVENTION

The present invention is accordingly directed to a system to inhibit the starting of a vehicle and provide an alarm signal to the driver unless the seat belt system has been properly utilized, but which is extremely difficult to disable so as to allow starting of the vehicle without the proper belt conditions, and moreover to a system having sufficient flexibility to allow unhampered starting of the vehicle during unusual emergency situations.

As will subsequently be disclosed in detail, the invention utilizes sensor switches in each of the seats of the vehicle which are equipped with belts and switches associated with each of the belt retractors to create the interlock arrangement. The arrangement of the switches is such that the occupant must first sit on the seat and then extend his seat belt from the retractor. The starter motor may then be engaged in the normal manner by closing the starter switch while the gear shift is in a non-drive position (neutral, park or reverse). If this sequence is not followed, i.e., if the seat belt is first extended and then the driver occupies the seat, the starter circuit will be disabled and an alarm will be sounded. This prevents the system from being bypassed by permanently extending the belt or by tampering with the switches so as to simulate an extended belt. The sequence interlock is achieved through the use of a unique switch arrangement at the retractor. The arrangement includes two switches arranged in parallel with one another and in series with the alarm and interlock circuits so that the alarm and interlock will be energized if either of the switches is closed. The first switch is mechanically linked to the retractor so that it is closed when the webbing is in a retracted position and opens when the webbing is extended. The second switch is closed by a signal produced upon closure of the seat switch but is interlocked to the first switch so that if the first switch is closed (the webbing is retracted) at the time the seat switch is closed, the second switch will not close. By this arrangement, the only way that both switches may be placed in the open condition so as to allow normal starting of the vehicle is to close the seat switch while the belt is retracted, to prevent closing of the second switch, and then to extend the belt webbing, so as to open the first switch.

Two embodiments of the invention are subsequently disclosed. In each of these embodiments the first switch is mechanically operated. In a first embodiment of the invention the second switch is of either the solid state or electromechanical variety. In a second embodiment of the invention, the second switch is an electromechanical switch having the form of a double reed relay.

The first and second switches are connected to the interlock through a circuit which inhibits the operation of the alarm and starter interlock if the vehicle stops by virtue of its engine stalling rather than its ignition switch being turned off. A stall condition is sensed by circuitry connected to a manifold vacuum switch and the ignition switch. If the manifold vacuum drops to a non-operating level before the ignition switch is opened, the stall circuit allows the engine to be started in the normal manner without the starter interlock or the alarm signal. Other operating engine conditions which might be used to sense a stall include engine speed, cooling water flow, etc. This stall circuit allows the vehicle to be quickly started, without unnecessary manipulatiion of the seat belts, in the event of an engine stall during normal operation of a vehicle.

The stall circuit comprises a switch which is normally closed and in the first embodiment of the invention is electronically reset into the closed position each time the ignition switch is opened within a few seconds before the manifold vacuum decreases to a non-operating value. If this sequence of conditions does not occur, the switch stays open allowing the next start to be made without the interlock and alarm. In the second embodiment of the invention, the stall circuit can comprise a switch responsive to pressure within the manifold of the engine. Such switch is normally closed, is moved by a pressure differential to an open position when the engine commences to run, and is mechanically reset to the closed position a preselected period of time after the engine stops running and the pressure differential commences to decrease.

The invention also employs an emergency switch which allows the operator to disable the operation of the starter interlock and the alarm during the next start of the vehicle. The emergency switch is located on the vehicle in a position not readily accessible from the driver's location, such as the glove compartment or in front of the engine firewall. The switch is useful in situations in which a vehicle engine is to be serviced or when the seat is occupied by someone who should not use the seat belt system for certain reasons, such as a pregnant woman.

Both the stall circuit and the emergency switch are essentially in series with the retractor switches and the interlock and alarm so that when they are opened the interlock and the alarm are effectively disabled.

The alarm preferably takes the form of both a dashboard light and an alarm tone or buzzer. Once the vehicle engine is started if the retractor switches are closed, as by the driver arising from the seat, the alarm will be sounded but the engine will not be stopped. The alarm can then be shut off by the driver resuming his seat while the seat belt is retracted and then extending the retractor.

The sequencing switches associated with the retractor could equally well be associated with the closure of the belt buckle, the bringing of the belt into contact with the body of a wearer (as might be detected by a conventional proximity or capacity detector) or with some combination of these or similar conditions. The broad concept of the invention is the generation of a sequence of operations relating to the seating of an occupant and the closure of a seat belt rather than to the more specific aspects as disclosed below in the preferred embodiments.

BRIEF DESCRIPTION OF THE DRAWINGS

Other objectives, advantages and applications of the invention will be made apparent by the following detailed description of the preferred embodiments of the invention. The description makes reference to the accompanying drawings in which.

Figure 1:
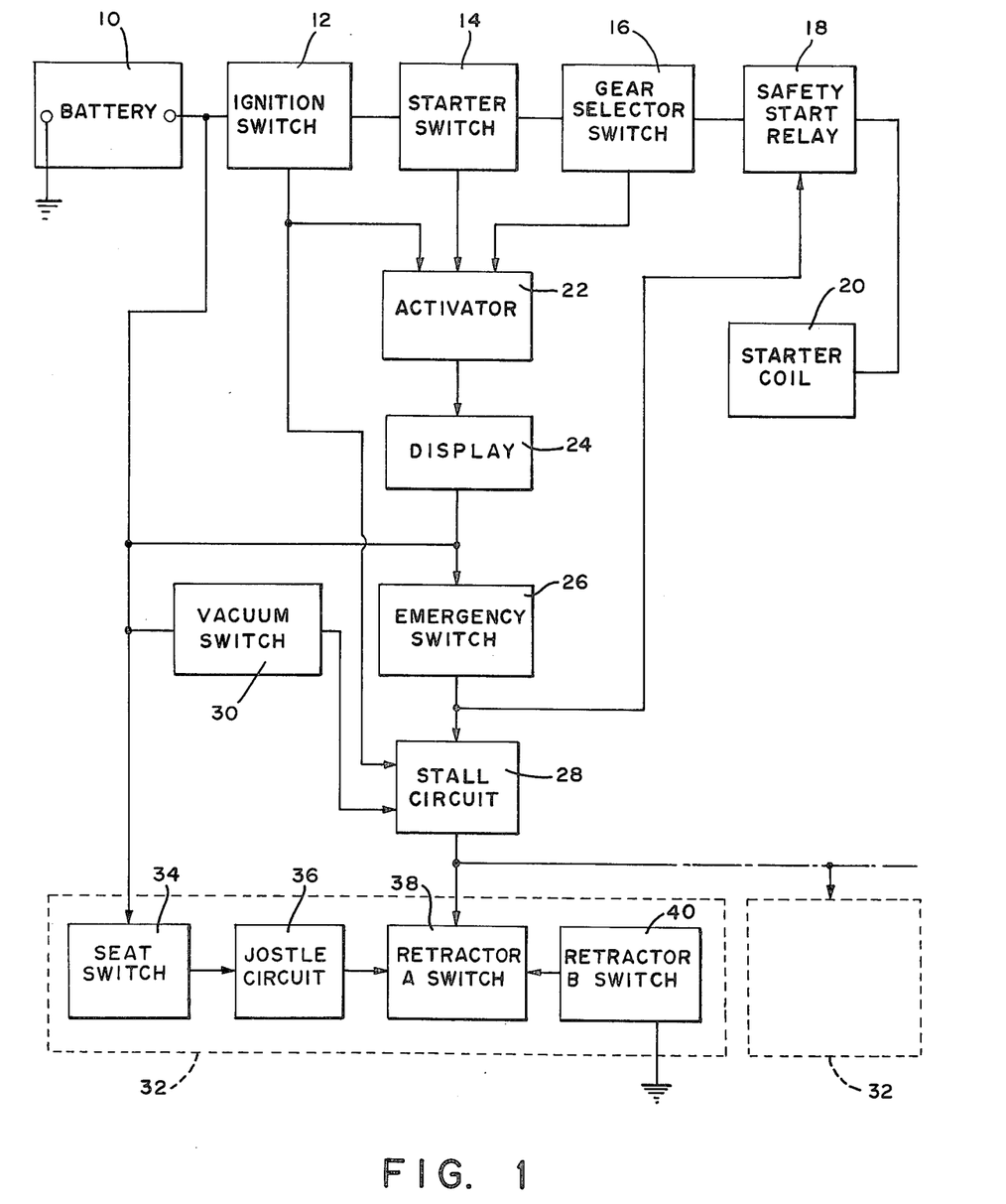
FIG. 1 is a block diagram of a system forming a first embodiment of the invention.

Referring to FIG. 1, the system is powered by a power source, illustrated by a storage battery 10 of the type generally found in a motor vehicle. The battery 10 has its negative terminal grounded to the vehicle chassis in the conventional manner. The positive battery terminal is connected to an ignition switch 12 and a starter motor switch 14 which is normally of the type associated with the ignition switch 12 so that a turn of the vehicle key in the extreme direction provides power to a starter motor (not shown). As is conventional, these units are further connected in series with a gear selector switch 16 which is in an open position when one of the forward drive gears is engaged but is closed when the gear selector is in neutral, park or reverse. These three units are connected in series with a safety start relay 18, essentially consisting of another series switch which is opened when the seat belts are not engaged in the proper manner. The safety start relay 18 in turn provides power to the starter coil 20 associated with the starter motor of the vehicle's engine. Accordingly, when the ignition switch 12 is closed, the starter switch 14 is momentarily contacted and the gear selector is in a non-drive position, power will be applied to the starter coil 20 if the safety start relay 18 is closed.

The ignition switch 12, starter switch 14 and gear selector switch 16 are all connected to an activator circuit 22. The activator circuit simply disables the balance of the control circuitry at such time as the gear shift lever (not shown) is in any of the non-drive positions and the starter switch is open so that accessories such as the radio may be used without going through the belt sequence. When the ignition switch 12 is closed, the starter switch 14 is closed and the gear selector is in a non-drive position, power is applied by the activator 22 to a display means 24 which contains a signal light and a buzzer to warn the driver of an improper condition of the seat belt.

This display means is in turn connected to an emergency switch 26 which allows the display means 24 and the safety start relay 18 to be disabled, so as to allow normal starting of the vehicle without going through the required belt sequence in an emergency situation. This emergency switch simply allows a single start. After the vehicle is started the system enters its normal mode and the next start cannot be accomplished with the safety belt in an improper condition. The emergency switch 26 also receives power from the battery 10 and applies power to a stall circuit 28. The stall circuit senses whether or not the engine is operating through a vacuum switch switch 30 is connected to the battery 10. The vacuum switch 30 is closed when the engine is operating.

As has been noted, the stall circuit 28 allows the system to be started one time with the seat belts in improper condition in the event that the engine dies, as indicated by the opening of the vacuum switch 30, before the ignition switch is opened. In an alternate form of the vacuum switch, hereinafter described, the switch remains open for a preselected period of time after the engine stops running, thereby permitting the system to be started a plurality of time during said preselected time interval with the seat belts in improper condition.

The stall circuit 28 connects to one or more seat associated units, generally indicated at 32. The vehicle may be equipped with a unit 32 only for the driver's position, or units 32 may be provided for all of the front car seats or they may be provided for each seat in the car. In the subsequent description of the embodiment of FIGS. 1 and 2, only one unit 32 is described for purposes of illustration.

Each unit 32 includes a seat sensor switch 34 connected to the battery 10 and constituting a single pole — single throw, normally open, pressure switch, which is closed by the pressure of an occupant sitting on the seat. The output of the seat switch 34 is provided to a jostle circuit 36 which constitutes a time delay. The circuit 36 will not provide an output if the seat switch 34 is only momentarily closed. Similarly, if the seat switch 34 is momentarily open after having been closed, the jostle circuit will isolate the subsequent circuitry from that interruption.

The jostle circuit 36 provides output to a switch 38 electronically associated with the seat belt retractor and referred to as retractor "A" switch. This switch is normally open, is switched to a closed position upon receipt of a signal from the jostle circuit indicating that the seat switch has been closed, but cannot go to that closed position if the seat belt webbing if fully withdrawn in the retractor. The switch 38 is also connected to what is termed a retractor "B" switch 40 mechanically associated with the retractor. This switch is opened when the webbing is drawn from the retractor and closed when the webbing is fully retracted.

When either of the retractor switches 38 or 40 is closed, and the system has not been released by actuation of the emergency switch 26 or the stall circuit 28, the safety start relay is held in an open position, the starter coil 20 may not be energized, and display means 24 is energized. Since the retractor "A" switch 38 is closed when the occupant sits on the seat switch 34 unless the seat belt webbing is fully retracted, the condition of both switches 38 and 40 being open, so as to allow normal starting, can only occur if the seat is not occupied or if the occupant sits on the seat while the webbing is fully retracted and is subsequently extended.

If the occupant sits down while the webbing is extended, the retractor "A" switch will close de-energizing the safety start relay 18 and energizing the alarm. At that point, he must allow the belt to be fully retracted, which opens the "A" switch 38 and then extend the webbing again to open the retractor "B" switch 40. Since he must go through this effort each time he sits down in the car, it is just as easy for the driver to properly fasten his belt.

Figure 2:
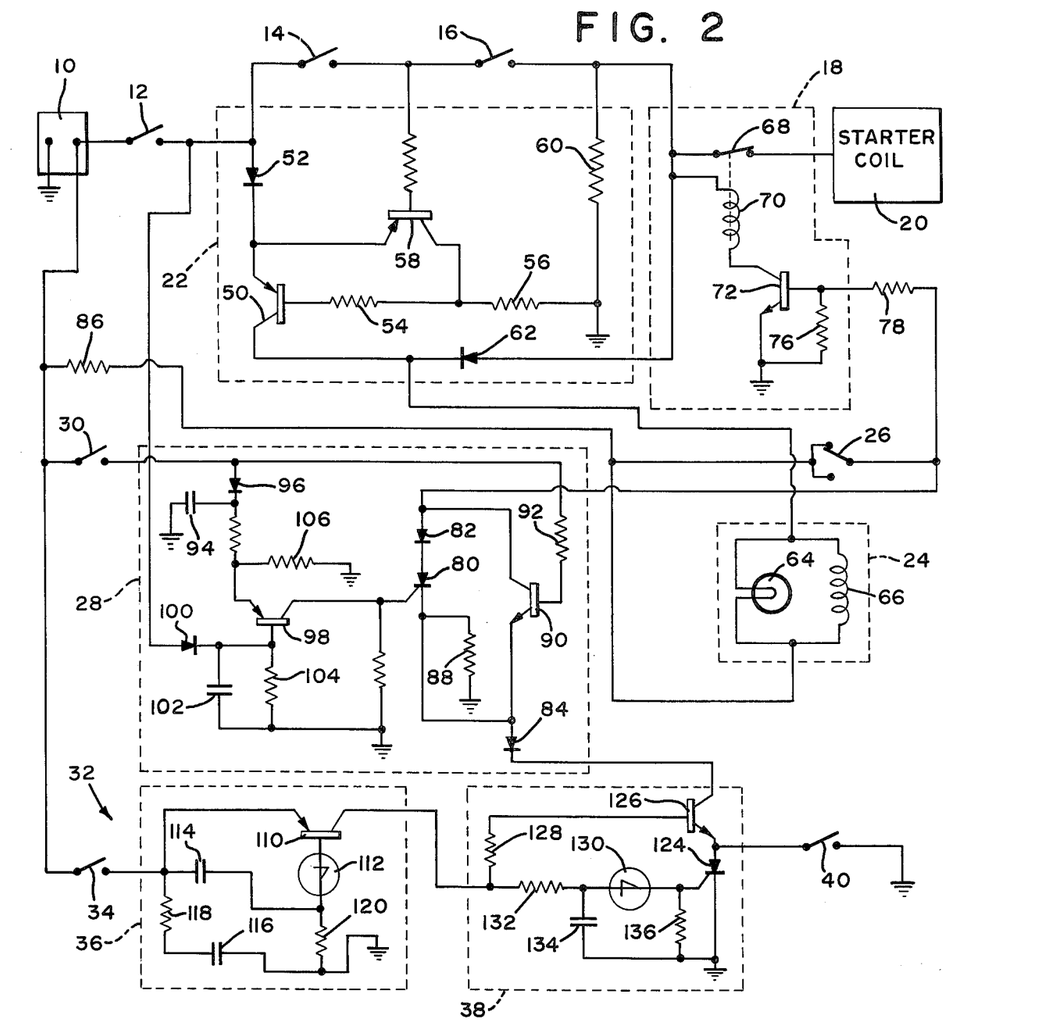
FIG. 2 is a schematic diagram of the system of FIG. 1.

FIG. 2 illustrates certain of the blocks of FIG. 1 in schematic detail as well as disclosing the circuitry for one form of the retractor switch.

As has been noted, the activator 22, disclosed in detail in FIG. 2, provides power to the display means 24 whenever the ignition switch 12 is on except when the gear selector is in park, neutral or reverse and the starter switch 14 is open. This allows the occupant to sit in the vehicle without the seat belt engaged, and he can use the accessories such as the heater and the radio without being annoyed by the display signals.

The activator circuit 22 includes a transistor 50 having its emitter coupled to a diode 52 that is in turn connected to the ignition switch 12. The collector of the transistor 50 connects to the display means 24, and the base of the transistor 50 is connected to ground through a pair of resistors 54 and 56. The transistor 50 is normally conductive and acts as the primary source of positive voltage for the display means 24. A second transistor 58 has its emitter-collector circuit connected between the emitter and the base of the transistor 50, in series with the resistor 54. The base of the transistor 58 is floating as long as the gear selector switch 16 is in a drive position. When the gear selector switch 16 is closed by placing the lever in park, neutral or reverse, the base of the transistor 58 is connected to ground through a resistor 60. This causes the transistor 58 to conduct and short out the transistor 50 so that it no longer conducts. Under these circumstances, with the starter switch 14 not engaged, no power is applied to the display means 24 and the operator can use the accessories without engaging the seat belt, without the annoyance of the display means 24. When the starter switch 14 is closed in an effort to start the motor, the display means 24 and the subsequent circuitry are provided with power through a diode 62 connected in series with the starter switch 14 and the gear selector switch 16.

The display means 24 simply contains the parallel combination of a lamp 64, located in the dashboard area so as to be readily visible to the driver, and an audio alarm device 66 which may be a buzzer, tone generator, or the like.

The emergency switch 26 is a single pole — double throw switch having both of its terminals connected together so that when the switch is actuated, conduction through it is only momentarily interrupted. A non-locking push button could be used in other embodiments of the invention.

The safety start relay 18 includes a solenoid operated switch 68 connected in series with the ignition switch 12, starter switch 14, gear selector switch 16 and the starter 20. Accordingly, when all of these switches are closed, power is applied to the starter motor. The coil 70 of the switch 68 is connected to the positive terminal of the battery 10 through the switches 12, 14 and 16 and to ground through the cllector-emitter circuit of a transistor 72. A biasing resistor 76 connects the base of the transistor 72 to ground and a resistor 78 connects the base to the emergency switch 26. The transistor 72 is normally conductive as long as its base is not grounded. Under conditions in which the starter is to be locked out, the base of transistor 72 is connected to ground through the stall circuit 28 and one of the seat switch arrangements 32 as will be subsequently described. When there is no path to ground through the stall circuit 28 and the seat circuit 32, the transistor 72 is conductive, the coil 70 is energized and the safety start relay is closed.

The stall circuit 28 connects the emergency switch 26 and the safety relay 18 to the seat switches through a path which normally comprises the anode-cathode circuit of a silicon controlled rectifier (SCR) 80. The rectifier 80 is connected in series with a pair of diodes 82 and 84 between the emergency switch 26 and the seat switches. When the ignition switch 12 is opened, assuming the controlled rectifier 80 to have been conductive, it maintains a conductive state by virtue of a connection to the battery 10 through a resistor 86 and the emergency switch 26, which connect to the diode 82, and a grounded resistor 88 connected to the anode of the SCR 80. The anode-cathode of the controlled rectifier 80 are shunted by the emitter-collector circuit of a transistor 90 that has its base connected to the positive terminal of the battery through the vacuum switch and a resistor 92. When the vacuum switch 30 is open, the transistor 90 is not conductive. The closing of the vacuum switch makes the transistor 90 conductive, shorting out the SCR 80 so as to effectively extinguish it. This occurs when the vehicle engine is started. Accordingly, the controlled rectifier 80 normally provides the conductive path between the emergency switch 26 and the seat switches 32, and when the engine starts, a path through the transistor 90 replaces the SCR path as the SCR becomes extinguished.

When the vacuum switch 30 closes, a charge is assumed by capacitor 94, which has one end grounded and the other end connected to the positive terminal of the battery through the vacuum switch 30 and a diode 96. This charge is applied to the emitter of a transistor 98 which has its collector connected to the gate of the SCR 80. The transistor 98 has its base connected to the positive terminal of the battery 10 through the ignition switch 12 and a diode 100. A high frequency filter consisting of a capacitor 102 shunted by resistor 104 is connected between the base of the transistor 98 and ground. This filter acts to pass line perturbations to ground so they won't accidentally trigger the transistor. The transistor 98 is normally nonconductive as long as the ignition switch 12 is closed, but when the switch 12 opens, it becomes conductive and applies the charge from the capacitor 94 to the gate of the controlled rectifier.

If potential exists between the anode and cathode of the controlled rectifier and if the transistor 90 is not conductive, this will fire the controlled rectifier 80 into conduction. If the transistor 90 is conductive when this current is applied to the gate of the controlled rectifier 80, the current will be ineffective to fire the controlled rectifier into conduction. In normal operation of the vehicle, when the engine is turned off, the transistor 98 will become conductive and will apply voltage to the gate of the SCR 80 as long as the vacuum switch 30 is closed and for a short period thereafter by virtue of storage of charge in the capacitor 94. When the vacuum switch then opens as a result of the vacuum of the engine dying, the transistor 90 becomes non-conductive and the controlled rectifier 80 goes into a conductive mode. The controlled rectifier 80 remains conductive as long as the engine is off by virtue of the holding current flowing through the resistors 86 and 88.

If the engine stalls while the ignition switch 12 is still closed, the transistor 90 will first become non-conductive and within a few milliseconds thereafter the charge will have dissipated from the capacitor 94 by virtue of a shunting resistance 106 which connects to ground. When the ignition switch is later opened to render the transistor 98 conductive, there will be no current to apply to the gate of the controlled rectifier 80 and the controlled rectifier 80 will remain inoperative. As will subsequently be described, this will de-energize the display means 24 and will close the safety start relay 18 so that the engine can be restarted in a normal manner without any manipulation of the seat belts. After the engine restarts, the circuitry will be returned to its normal mode, and if the ignition switch 12 is opened before the vacuum switch 30, the next time the controlled rectifier 80 will remain conductive and will prevent subsequent starting of vehicle without proper operation of seat belts.

The jostle circuit 36 contained within each individual seat switching arrangement 32 includes a transistor 110 with its emitter connected to the seat switch 34 and its collector connected to the retractor switch "A" 38. When the transistor 110 is conductive, the switch 38 is therefore connected to the positive terminal of the battery. The transistor 110 has a silicon asymmetrical switch (SAS) 112 connected to its base and a capacitor 114 connected between its emitter and the SAS. A second capacitor 116 is connected to the emitter through a resistor 118 and has its other end grounded. A resistor 120 connects the junction of the capacitor 114 and the SAS 112 to ground.

When the seat switch 34 closes, both the capacitors 114 and 116 are charged, the capacitor 114 more quickly because of its direct connection to positive terminal. Immediately after the closure of the seat switch 34, the voltage on both sides of the SAS 112 will be identical. However, as the capacitor 114 begins to charge a differential voltage will appear across the SAS, and when its breakdown voltage is reached, it will become conductive and effectively connect the base of the transistor 110 to ground putting the transistor in a conductive mode. The SAS 112 and capacitor 114 thus provide a time delay for the application of current from the switch 34 to the retractor switches. If the seat switch 34 is only momentarily closed, the capacitor 114 will not have enough time to charge and the transistor 110 will not be switched into its conductive mode. When the seat switch 34 is opened after having been closed for some time, the charge of the capacitor 116 will maintain the transistor 110 in a conductive mode for a short period of time. If the seat switch recloses during that time, the jostle circuit will have acted to isolate the retractor switches from the power interruption.

The retractor switch "A" illustrated in FIG. 2 is built about a controlled rectifier 124. The anode of the rectifier is grounded and the cathode is connected to the stall circuit 28 through the emitter-collector circuit of a transistor 126. The base of the transistor 126 is connected to the jostle circuit 36 through a resistor 128. The gate of the controlled rectifier 124 is connected to the jostle circuit through an SAS 130 in series with a resistor 132. A capacitor 134 is connected between the common terminal of the SAS 130 and the resistor 132 and ground, while the resistor 136 is connected between the gate of the controlled rectifier 124 and ground.

Retractor switch "B" 40 constitutes a single pole —single throw switch connected to the retractor so as to be closed when the belt is fully retracted and otherwise open. It is connected between ground and the anode of the silicon controlled rectifier 124.

While the webbing is fully retracted, since the retractor switch "B" is closed, the controlled rectifier 124 is shorted out and cannot become conductive. When a section of the webbing is extended so as to open the retractor switch 40, voltage applied to the base of the transistor 126 through the jostle circuit will render it conductive, and when the SAS 130 breaks down, a pulse will be applied to the gate of the controlled rectifier 124 rendering it conductive.

When the controlled rectifier 124 is conductive or the retractor switch "B" is closed, the display means 24 is connected across the terminals of the battery through the ignition switch 12, the activator 22, the emergency switch 26 and the stall circuit 28, assuming that the activator 22 and the stall circuit 28 are in their conductive condition. This will energize the display means and will also ground the base of the transistor 72 contained within the safety start relay 18 so as to prevent energization of the coil 70 of the safety start relay. Thus, when the starter switch 14 is on and the transmission switch 16 is in park, neutral or reverse, the display means 24 will be energized and safety start relay 18 will be disabled unless both the retractor switches "A" and "B" are open. Disablement of the safety start relay 18 and energization of the display means 24 cannot occur with the retractor switches "A" and "B" open so long as the seat switch 34 is open; but when the seat switch 34 is closed, indicating that a seat is occupied, the closure must have occured while the webbing was in its fully retracted position, i.e., when retractor switch "B" was closed, and then the webbing must subsequently have been extended from the retractor so as to open switch "B". Any other sequence will cause one or the other of the switches 38 or 40 to close. Only the provision of means for insuring that the controlled rectifier 124 cannot fire while the webbing is fully retracted will allow the closure of the seat switch during that time and a subsequent opening of the retractor switch "B" to de-energize the alarm and energize the safety start relay 18.

Figure 3:
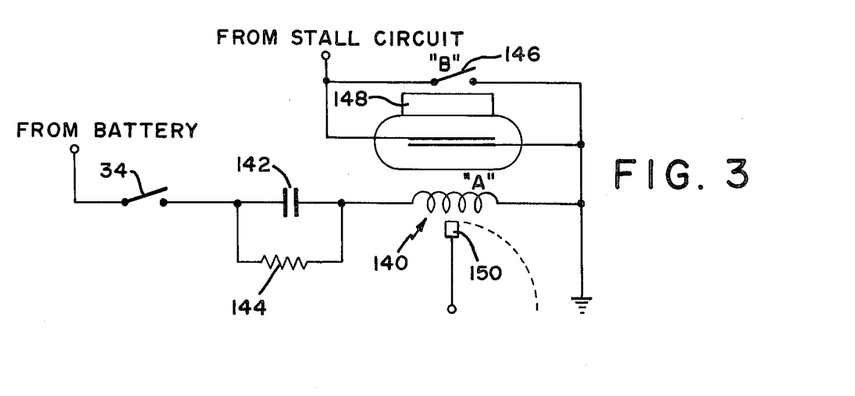
FIG. 3 is a schematic diagram of a modification of the two retractor switches of the embodiment illustrated in FIG. 2.

FIG. 3 illustrates a modification of the retractor switches "A" and "B". In this modification the seat switch (or jostle switch, if one is used) is connected in series with the coil of a reed relay 140 through a capacitor 142 shunted by a resistor 144. The contacts of the reed relay 140 are connected between ground and the stall circuit 28. These contacts are shunted by the retractor "B" switch 146 which again constitutes an on-off switch coupled to the action of the retractor.

The reed relay employs a keeper magnet 148 to retain the contacts of the relay in a closed condition once they do close.

Another magnet 150 is mechanically coupled to the retractor reel so as to be in the proximity of the reed relay when the webbing is fully retracted (when switch 146 is closed). This magnet has a field which counteracts the field generated by the coil of the reed relay and prevents the closure of the reed relay contacts. It also acts to open the reed relay contacts when the retractor returns to the fully retracted position if they have been closed while the magnet 150 is out of position. The magnet 150 is thus mechanically connected to the switch 146 so that when the switch is closed the magnet is in position to prevent the closure of the reed relay 140.

When the seat switch is closed the capacitor 142 charges and provides a current surge to the coil of the reed relay 140. If the magnet 150 is out of position with respect to the coil, as it is when the webbing is extended, this current will close the relay. The keeper magnet 148 will retain the contacts closed after the termination of the surge. In order to open the contacts it will be necessary to allow the webbing to be fully retracted so that the magnet 150 is brought into position to counteract the field of the keeper magnet.

If the magnet 150 is in position adjacent to the coil of the reed relay 140 upon the closure of the seat switch the contacts of the reed relay will remain open and the switch 146 will open as soon as the belt is extended, allowing normal operation of the starter and inhibiting the alarm.

Figure 4:
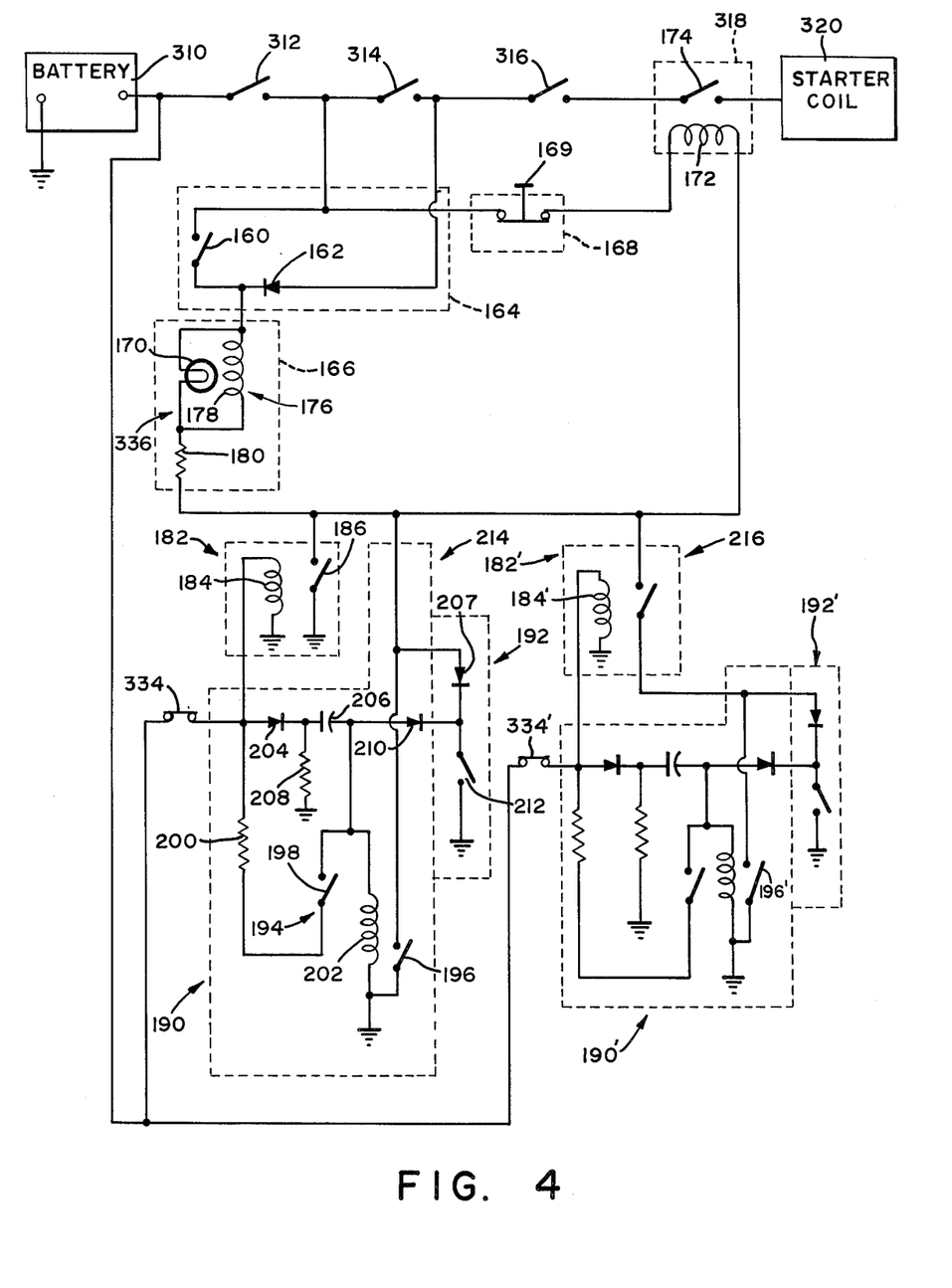
FIG. 4 is a schematic diagram of a second embodiment of the invention.

In FIG. 4, there is shown schematically a second embodiment of the invention. A battery 310, ignition switch 312, starter motor switch 314, gear selector switch 316, safety start relay 318 and starter coil 320 are connected in series in the manner described in connection with FIGS. 1 - 2. Each of the ignition switch 312, starter switch 314 and gear selector switch 316 is connected to an activator circuit 164, which comprises a microswitch 160 and a diode 162.

The microswitch 160 is connected in series between the ignition switch 312 and a display means 166 which contains a signal light and a buzzer to warn the driver of an improper condition of the seat belt. Such microswitch 160 moves from a closed position to an open position whenever the gear selector switch 316 is in any of the non-drive positions. Accordingly, when the gear selector switch 316 is in a non-drive position and the starter switch 314 is open, the radio, courtesy lights, and other accessories of the vehicle may be used without going through the belt sequence to prevent energization of the display means 166.

The diode 162 is connected in series between the starter switch 314 and the display means 166. When the ignition switch 312 is closed, the starter switch 314 is closed and the gear selector switch 316 is in either a drive or a non-drive position, power is applied by the activator circuit 164 to the display means 166. The diode 162 functions to prevent application of power to the starter switch 314 through the activator circuit 164.

One end of a vacuum switch 168 is electrically connected to the activator circuit between the ignition switch 312 and the microswitch 160. The other end of the vacuum switch 168 is electrically connected to the safety start relay 318, so that the vacuum switch is in series between the activator circuit 164 and the safety start relay 318. Vacuum switch 168 is moved from a normally closed to an open position by a pressure differential created by loss of pressure from the engine manifold when the engine commences to run. The vacuum switch 168 remains open while the engine is running and for a preselected period of time after the engine ceases to run and the pressure differential commences to decrease, as in the order of about 1 to 3 minutes. When the vacuum switch 168 and the ignition switch 12 are closed and the seat belts are not properly fastened, power is applied through the vacuum switch 168 to a coil 172 within a solenoid operated switch 174 of the safety start relay 318. The coil 172 is energized and opens the normally closed switch 174 to prevent application of power to the starter coil 320. In the event that the engine stalls or otherwise ceases to run, the vacuum switch 168 remains open for the preselected period of time during which the coil is not energized, and switch 174 of the safety start relay 318 remains closed to permit application of power from the battery 10, through the ignition switch 312, starter motor switch 314, gear selector switch 316 and safety start relay 318 to the starter coil 320, despite any improper engagement of the belt. The display means 166 is not disenabled during the preselected time period and advantageously serves to inform vheicle occupants if the belts are not properly fastened upon closure of the ignition and starter switches 312 and 314, respectively.

The vacuum switch 168 can be manually opened by depressing a non-locking push button 169 structurally connected thereto. By this means or through other suitable conventional mechanical means, the vacuum switch can be readily adapted for use as an emergency switch of the type described above.

The display means 166 contains in parallel the combination of a lamp 170, located in the dashboard area so as to be readily visible to the driver, and an audio alarm 176 of the type described above. Lamp 170 comprises a filament constructed of tungsten or other suitable material which is heated upon application of power. A first end of the filament is electrically connected to the activator circuit 164, and a second end of the filament is structurally connected to means (not shown) for temporarily interrupting application of power across the lamp 170. Such means preferably comprises a bimetallic element having at least two thermally conductive members comprised, for example, of such metals as copper, tin, stainless steel, iron, nickel, brass, or other suitable conductive material, each member respectively having a different thermal coefficient of expansion. Such members are welded or otherwise adhered together to form a composite member having the form of a relatively straight bimetallic element. Invar (iron-nickel alloy) and brass are commonly paired to create such bimetallic elements, and these metals are suitable for use in the bimetallic element of lamp 170. One end of the bimetallic element is fixed, as by riveting, spot welding or otherwise firmly securing the end to a stationary non-conductive support (not shown). The other end of the bimetallic element is normally in structural contact with an electroconductive member (not shown) so as to bring the second end of the filament in electrical contact with the electroconductive member. Such electroconductive member can be grounded through (1) a switch, generally indicated at 182, in series with a seat switch 334 and responsive thereto, (2) a first retractor switch, generally indicated at 190, or (3) a second retractor switch, generally indicated at 192, as hereinafter described. Upon application of voltage to the lamp 170, the filament heats the bimetallic element. When the bimetallic element reaches a sufficiently high temperature, the thermal expansion differential of the two members causes the element to move away from and break electrical contact with the electroconductive member, thereby extingusihing the lamp 170. When the bimetallic element cools sufficiently to resume its original configuration, the circuit is completed and the lamp 170 is again illuminated.

The resistance value of the lamp is lower than that of the coil 178 of the audio alarm, generally indicated at 176. A voltage reducing resistor 180 of display means 166 is connected in series between the display unit formed by the parallel combination of the lamp 170 and the audio alarm 176, and each of switch 182, the first retractor switch 190 and the second retractor switch 192, the resistor 180 serves to reduce the voltage across the alarm 176. The resistor has a resistance value sufficiently high that the alarm 176 is not energized when the lamp 170 is on, the resistance value of the resistor 180 depending upon the resistance values of the lamp 170 and the alarm 176, respectively. For a lamp having a resistance of about 12 ohms, the resistance value of the resistor 180 is in the order of about 12 ohms. When the electrical contact between the bimetallic element and the electroconductive member is broken and the lamp 170 is extinguished, power applied through the coil 178 is sufficient to energize the alarm 176. Thus, upon energization of the display means 166, the resistor 180 (1) enables the lamp 170 to temporarily shunt out the alarm 176, and (2) functions with the lamp 170 to provide a time delay for the application of current from the activator circuit 164 to the alarm 176. If the display means 166 is only momentarily energized, as, for example, by closure of the ignition, starter and seat switches with a seat belt improperly engaged, the bimetallic element is not heated to a temperature sufficently to break electrical contact with the electroconductive member, and the alarm 176 is not energized. Under such conditions, the lamp 170 and resistor 180 form a time delay circuit, generally indicated at 336, which visually indicates the improper condition without the audible signal created by energization of the alarm 176. A similar result is produced without the voltage reducing resistor 180 by connecting a time delay circuit (not shown) of the type described in connection with FIGS. 1 - 2 in series with the alarm 176 and in parallel with the lamp 170.

Switch 182 comprises a coil 184 connected in series between the seat switch 334 and ground, and a relay 186 which is moved from a normally closed position to an open position upon application of power to the coil 184. When an occupant of the vehicle is seated behind the steering wheel, the seat switch closes, the coil 184 is energized and the relay 186 moves to an open position. Under such conditions, the display means 166 is not grounded through the switch 182 but can be grounded through the retractor switches 190 and 192, respectively, as hereinafter described.

The retractor switch 190 is built around a double reed relay unit, generally indicated at 194. A first relay 196 of the relay unit 194 is connected between ground and the display means 166. A second relay 198 is connected in series with the seat switch 334 between a resistor 200 and a coil 202 of the relay 194. Such coil 202 is connected between ground and the seat switch 334 through two separate paths. The first path includes the resistor 200 and the second relay 198. The second path includes a diode 204 having one end connected to the seat switch 334 and the other end connected to the coil 202 through a capacitor 206. Diode 204 functions to maintain the charge on the capacitor 206 during application of power from the seat switch 334. A resistor 208 functions to bleed down the capacitor 206 when power is not applied to the diode 204 by the seat switch 334.

The second retractor switch, or belt switch, 192 comprises a diode 207 in series with a single pole - single throw switch 212 connected to the retractor (not shown) so as to be closed when the belt is fully retracted. Switch 212 is moved to an open position upon extraction of the belt. One end of switch 212) is connected to ground. The other end of switch 212 is connected in series with (1) capacitor 206 through a diode 210 and (2) the display means 166 and the safety start relay 318 through the diode 207. Diode 207 prevents application of power from the diode 210 to the display means 166 and the relay 318, respectively. Diode 210 prevents application of power from the display means 166 and the relay 318 to the coil 202 of relay 194.

While the webbing is fully retracted, since the second retractor switch 192 is closed, the double reed relay 194 is shorted out and cannot become conductive. If a section of the webbing is extended so as to open the belt switch 192 and the seat switch 334 is then closed, a pulse from capacitor 206 is applied to the coil 202 of the double reed relay 194. The coil 202 is energized by the pulse and causes relays 196 and 198 to move to a closed position. Upon closure of relay 198, power from battery 10 is applied to the coil through seat switch 334, resistor 200 and switch 198, thereby energizing the coil 202 so as to hold the first and second relays 196 and 198 in the closed position. Closure of the first reed relay 196 grounds the display means 166 and the coil 172 of the safety start relay 18. Switch 174 is moved to an open position to lock out the starter, and the display means 166 is energized to warn vehicle occupants of the improper condition of the belt. In order to disable the display means 166 and start the vehicle, it is necessary to recycle the interlock system by moving the webbing so as to fully retract and then extend the belt. Unless each of retractor switches 190 and 192 is open when the starter switch is closed, the display means 166 is energized and the safety start relay 318 is disabled.

Switch 182, seat switch 334 and the first and second retractor switches 190 and 192 collectively represent a seat unit, generally indicated at 214, associated with the driver's seat. Preferably, each of the remaining seats of the vehicle is provided with units of the type generally indicated at 216. First and second retractor switches 190' and 192' and seat switch 334' of the unit 216 are constructed and operated in the same manner as retractor switches 190 and 192 and seat switch 334 of unit 214.

However, the switch 182' of unit 216 differs from switch 182 of unit 214 in that the switch 182' is (1) in series with and between each of the display means 166 and the coil 172 of the safety start relay 318, and the belt switch 192' and the first reed relay 196' of the first retractor 190', and (2) moved from a normally open position to a closed position upon application of power to the coil 184' thereof. Advantageously, when the seat switch 334 is not closed, the display unit 166 and the coil 172 of the safety start relay 318 are grounded via switch 182 even though (1) there is no occupant seated within the vehicle, or (2) an occupant seated on unit 216 has properly followed the sequence prescribed by unit 216. This feature serves to prevent the car from being started unless an occupant seated on the driver's seat has properly followed the sequence prescribed by unit 214.

Disenablement of the safety start relay 318 and energization of the display means 166 can occur so long as switch 334 is open and switch 182 is closed, regardless of the condition created by activator circuit 164. When the seat switch 334 is closed, indicating that the unit 214 is occupied and the unit 216 is not occupied, the closure must have occurred while the retractor was in its fully retracted position, i.e. when the first retractor swtich 190 was closed, and then the webbing must have subsequently been extended from the retractor so as to open the first retractor switch 192. Any other sequence will cause one or the other of the switches 190 and 192 to close. The provision of means for insuring that the double reed relay 194 cannot be energized while the webbing is fully retracted allows the closure of the seat switch 334 during that time to de-energize the display means 166 and energize the safety start relay 318. When the seat switches 334 and 334' are closed, indicating that the units 214 and 216 are both occupied, the closure of each seat switch must have occurred while its respective first retractor switch was closed and then each of the webbings must have subsequently been extended from its retractor so as to open its respective first retractor switch. Any other sequence will energize the display means 166 and disenable the safety start relay 318. Advantageously, normal starting of the vehicle is prevented if either of the occupants of units 214 and 216 does not follow the required sequence. Hence, even though such sequence is followed by the occupant of unit 214, the starter is locked out and the display means 166 is energized unless the occupant of unit 216 closes switch 334' while his belt is retracted, to prevent cosing of the switch 190', and subsequently extends the belt webbing, so as to open switch 192'.

It should be recognized that other embodiments of the present invention may use sequencing switches operated in a different manner from those of preferred embodiments. For example, the "B" switch may well be replaced by a switch operated upon closure of the seat belt buckle rather than extension of the webbing. Similarly, additional conditions may be applied to the sequence, such as provision of proximity sensing elements to the belt which would insure that the belt is in contact with the body of the wearer. For example, the sequence may require the closure of the seat switch while the belt is fully retracted, then a signal from the switch indicating that the belt is being extended and then a signal from a buckle indicating that the buckle is being closed. Other such sensor arrangements and sequences can be used in practice of the present invention.

Having thus described our invention in rather full detail, it will be understood that these details need not be strictly adhered to but that various changes and modifications may suggest themselves to one skilled in the art, all falling within the scope of the invention as defined by the subjoined claims.

We claim:

1. In a vehicle having a belt section for restraining an occupant in a seat, first sensor means for sensing whether the belt section has a protracted or retracted condition; second sensor means for sensing whether or not the seat is occupied; a starter motor; circuit means for receiving the outputs of both said first and second sensor means and for inhibiting the energization of said starter motor under conditions of said first and second sensor means other than conditions indicating that the seat has first been occupied and then said belt section has been placed in a protracted condition; and means for sensing a stall of the engine and for allowing the engine to be started one time independently of the condition of the sensing means following a stall;

said means for sensing the stall of the engine and for allowing the engine to be started one time independently of the condition of the sensing means including a switch having a first state wherein said circuit means for receiving the output of said first and second sensor means and for inhibiting the energization of said starter motor under conditions other than those indicating that the seat has first been occupied and then the belt section has been placed in a protracted condition is operative, and a second state wherein said circuit means is inoperative, said switch means being connected to the ignition switch of said vehicle and to a third sensor means operative to provide a signal when the engine stops running after the ignition switch has been closed and being normally in its first state and switched to its second state upon receipt of the signal from said third sensor means.

2. The vehicle of claim 1 wherein said means for inhibiting the energization of said starter motor includes a normally closed switch connected to said starter motor and a source of power for said starter motor, and said means for sensing a stall of said engine and for allowing the engine to be started one time independently of the condition of said sensing means includes means for preventing opening of said normally closed switch.

3. The safety belt system of claim 1 wherein an ignition switch, a starter switch, a gear selector switch and said relay of said safety start relay switch are connected in series with and between said power source and said starter motor and said coil of said safety start relay switch is connected in series with and between said ignition switch and each of said belt switch and said first reed relay.

4. The safety belt system of claim 3 wherein said circuit means includes a display means in series with and between said ignition switch and each of said belt switch and said first reed relay.

5. The safety belt system of claim 4 wherein said display means comprises a lamp in parallel with the combination in series of a resistor and an audio alarm.

6. The safety belt system of claim 5 wherein said circuit means includes an activator circuit in series with and between said ignition switch and said display means, and said activator circuit comprises a microswitch in series with and between said ignition switch and said display means, said microswitch being connected to the gear selector of said vehicle so as to move from a closed position to an open position when said gear selector is moved from a drive position to a non-drive position.

7. The safety belt system of claim 6 wherein said activator circuit includes a diode in series with and between said starter switch and said display means and said activator circuit is additionally in series with and between said ignition switch of each of said belt switch and said first reed relay.

8. The safety belt system of claim 4 wherein said display means comprises a unit including a lamp in parallel with an audio alarm, said lamp having a resistance value lower than that of said audio alarm, and a resistor in series with and between said unit and each of said belt switch and said first reed relay, said resistor having a resistance value of sufficient magnitude to prevent energization of said audio alarm when said lamp is illuminated and to permit energization of said audio alarm when said lamp is extinguished, and said lamp comprising means for temporarily interrupting application of power thereacross.

9. The safety belt system of claim 8 wherein said circuit means includes an activator circuit in series between said ignition switch and said display means, and said activator circuit comprises a microswitch in series between said ignition switch and said display means and a diode in series between said starter switch and said display means, said microswitch being associated with said gear selector so as to move from a closed position to an open position when said gear selector is moved from a drive position to a non-drive position.

10. The safety belt system of claim 9 wherein said circuit means includes a vacuum switch in series between said activator circuit and said coil of safety start relay, said vacuum switch being moved from a normally closed position to an open position when said engine commences to run and remaining in said open position for a preselected period of time after said engine ceases to run.

11. The safety belt system of claim 9 wherein said circuit means includes a relay connected with the between ground and each of said resistor of said display means and said coil of said safety start relay and having a coil in series between ground and said seat switch, said relay being moved from a normally closed position to an open position upon energization of its coil.

12. In a safety belt system adapted to be disposed in a vehicle having a starter motor and including a belt having an extended and a retracted position, the combination comprising:
a source for supplying electrical power;
a seat switch connected to said power source and associated with a seat of the vehicle;
said seat switch having an open position when said seat is unoccupied and a closed position when said seat is occupied;
a belt switch associated with said belt and having an open position when said belt is in said extended position and a closed position when said belt is in said retracted position; and
circuit means connected to said seat and belt switches so as to be grounded when said belt switch is in the closed position, for disabling said starter motor until (1) said seat switch is closed while said belt switch is in its closed position, and (2) said belt swtich is subsequently moved to its open position;
said circuit means including
a safety start relay switch having a relay in series with and between said power source and said starter motor and a coil in series with and between said power source and said belt switch, whereby said relay is moved from a normally closed position to an open position upon energization of its coil;
a double reed relay switch having a coil connected in series with and between ground and said seat switch through two separate paths, and a first and second reed relay, each of which is moved from a normally open position to a closed position upon energization of said coil;
the first of said paths containing a diode in series with a capacitor and a second of said paths containing a resistor in series with said second reed relay; and
said first reed relay being in series with and between ground and said coil of said safety start relay and being shunted while said belt switch is in its closed position.

* * * * *

UNITED STATES PATENT AND TRADEMARK OFFICE
CERTIFICATE OF CORRECTION

PATENT NO. : 4,107,645
DATED : August 15, 1978
INVENTOR(S) : Donald J. Lewis and Albert J. Jankowski It is certified that error appears in the above-identified patent and that said Letters Patent are hereby corrected as shown below:

Column 4, line 39 "switch switch" should be -- switch --.
          line 39 after "30" add -- which --.
Column 5, line 9 "if" should be -- is --.
Column 7, line 48 after "of" add -- the --.
          line 49 after "of" add -- the --.
Column 8, line 63 "occured" should be -- occurred --.
Column 10, line 40 "vheicle" should be -- vehicle --.
Column 11, line 21 "extingusihing" should be -- extinguishing --.
Column 13, line 26 "swtich" should be -- switch --.
           line 50 "cosing" should be -- closing --.
Column 15, line 33 "position," should be -- position.--.
           line 36 after "of" insert -- said --.
           line 43 "the" should be -- and --.

Signed and Sealed this

Nineteenth Day of June 1979

[SEAL]

Attest:

RUTH C. MASON
Attesting Officer

DONALD W. BANNER
Commissioner of Patents and Trademarks